(12) United States Patent
Walther (10) Patent No.: US 8,314,941 B2
(45) Date of Patent: Nov. 20, 2012

(54) CARTESIAN COORDINATE MEASUREMENT FOR ROTATING SYSTEM

(75) Inventor: Jonas Walther, Solna (SE)

(73) Assignee: Micronic Mydata AB, Taby (SE)

( * ) Notice: Subject to any disclaimer, the term of this patent is extended or adjusted under 35 U.S.C. 154(b) by 401 days.

(21) Appl. No.: 12/591,954

(22) Filed: Dec. 4, 2009

(65) Prior Publication Data

US 2010/0141966 A1    Jun. 10, 2010

Related U.S. Application Data

(60) Provisional application No. 61/193,522, filed on Dec. 5, 2008.

(51) Int. Cl.
*G01B 11/14* (2006.01)
*G01B 11/26* (2006.01)

(52) U.S. Cl. ............... 356/622; 356/620; 356/141.5; 356/4.08

(58) Field of Classification Search .......... 356/614, 356/622, 4.08, 4.01, 5.01, 139.07, 141.3, 356/620, 141.4, 141.5; 250/206.2, 131.13, 250/236, 559.38
See application file for complete search history.

(56) References Cited

U.S. PATENT DOCUMENTS

| 4,673,287 A | 6/1987 | Rickus |
| 4,680,148 A * | 7/1987 | Arbisi et al. ................ 261/120 |
| 5,251,013 A | 10/1993 | Danielson et al. |
| 5,894,123 A | 4/1999 | Ohtomo et al. |
| 6,249,338 B1 * | 6/2001 | Ohtomo et al. ............ 356/4.08 |
| 6,362,454 B1 * | 3/2002 | Liu ........................ 219/121.7 |
| 6,483,106 B1 * | 11/2002 | Ohtomo et al. ............ 250/236 |
| 6,493,067 B1 * | 12/2002 | Kodaira et al. ............ 356/4.08 |
| 6,756,581 B2 * | 6/2004 | Ohtomo et al. ......... 250/231.13 |
| 2004/0125365 A1 * | 7/2004 | Ohtomo et al. ........... 356/141.5 |
| 2007/0024845 A1 * | 2/2007 | Essling et al. ............ 356/141.4 |

OTHER PUBLICATIONS

International Search Report and Written Opinion dated Apr. 7, 2010 for International Application No. PCT/EP2009/066410.

* cited by examiner

*Primary Examiner* — Sang Nguyen
(74) *Attorney, Agent, or Firm* — Harness, Dickey & Pierce, P.L.C.

(57) ABSTRACT

In a measurement device for measuring a peripheral position in a Cartesian coordinate system, a rotating laser source is configured to emit a laser beam along a radius of a rotator. A reflector is configured to reflect the laser beam in a direction orthogonal to a path of the laser beam, and a scale having a pattern of transparent and reflective areas is positioned at a peripheral position of the measurement device. A detector is configured to provide a sequence of pulses by detecting a reflex or transmission of the rotating laser beam while the laser scans over the scale. The sequence of pulses correspond to Cartesian coordinates of the system.

23 Claims, 5 Drawing Sheets
(4 of 5 Drawing Sheet(s) Filed in Color)

CARTESIAN COORDINATE MEASUREMENT FOR ROTATING SYSTEM

CROSS-REFERENCE TO RELATED APPLICATION(S)

This non-provisional patent application claims priority under 35 U.S.C. §119(e) to U.S. provisional patent application No. 61/193,522, filed on Dec. 5, 2008, the entire contents of which is incorporated herein by reference.

BACKGROUND

Description of Conventional Art

Accurately measuring a peripheral position in a Cartesian coordinate system is relatively difficult when using a rotating system.

Conventionally, peripheral position(s) is/are measured by an angular measurement device, and the Cartesian coordinate(s) is/are calculated using a radius determined by the angular measurement device. An example of a conventional angular measurement device is a rotary encoder having a circular disc with angular spaced gratings that are optically detectable.

To calculate the Cartesian coordinate(s) in a conventional angular measurement device, the radius must be constant and known in advance. But, in a rotating system with multiple arms, multiple radiuses may exist. Moreover, peripheral positions may change due to temperature variations, rotational speed, dynamic mechanical effects, etc. For example, if the center of rotation varies, peripheral positions are not measured accurately when measuring the angle. This leads to errors in the determined Cartesian coordinate(s).

SUMMARY

Example embodiments provide methods and measurement devices for measuring a position of a laser beam, where the laser beam is reflected along an arm of a rotator towards a scale at a given or desired peripheral position. As will be described in more detail below, the scale (or grating) is a pattern of transparent and reflective areas, which transmit or reflect the laser beam.

Example embodiments relate to pattern generation systems, measurement or inspection devices, systems and tools, and Cartesian coordinate measurement methods.

Example embodiments provide methods and apparatuses for measuring a peripheral position in a Cartesian coordinate system. In one example, a peripheral position refers to the position on the circumference given by the rotation angle and the radius in a polar coordinate system.

Cartesian coordinate measurements may be used to pick-up, place, draw and/or measure objects whose position is defined in Cartesian coordinates using a system that moves in a combination of rotational and linear motion. In one example, this would be the case when exposing a pattern drawn in a standard Cartesian XY coordinate system.

According to certain example embodiments, at least one detector system is configured to detect a reflex or transmission of laser light stemming from a laser source emitting laser light impinging on a surface along a radius of a rotating arm comprising an optical system while the laser light is scanning over a scale or grating positioned above or below the peripheral position along the radius of the rotating arm.

BRIEF DESCRIPTION OF THE DRAWINGS

The patent or application file contains at least one drawing executed in color. Copies of this patent or patent application publication with color drawing will be provided by the Office upon request and payment of the necessary fee.

Example embodiments will be described with regard to the drawings in which.

DETAILED DESCRIPTION

Example embodiments will now be described more fully with reference to the accompanying drawings, in which some example embodiments are shown. In the drawings, the thicknesses of layers and regions are exaggerated for clarity. Like reference numerals in the drawings denote like elements.

Detailed illustrative embodiments are disclosed herein. However, specific structural and functional details disclosed herein are merely representative for purposes of describing example embodiments. Example embodiments may be embodied in many alternate forms and should not be construed as limited to only the example embodiments set forth herein.

It should be understood, however, that there is no intent to limit example embodiments to the particular ones disclosed, but on the contrary example embodiments are to cover all modifications, equivalents, and alternatives falling within the appropriate scope. Like numbers refer to like elements throughout the description of the figures.

It will be understood that, although the terms first, second, etc. may be used herein to describe various elements, these elements should not be limited by these terms. These terms are only used to distinguish one element from another. For example, a first element could be termed a second element, and, similarly, a second element could be termed a first element, without departing from the scope of example embodiments. As used herein, the term "and/or," includes any and all combinations of one or more of the associated listed items.

It will be understood that when an element is referred to as being "connected," or "coupled," to another element, it can be directly connected or coupled to the other element or intervening elements may be present. In contrast, when an element is referred to as being "directly connected," or "directly coupled," to another element, there are no intervening elements present. Other words used to describe the relationship between elements should be interpreted in a like fashion (e.g., "between," versus "directly between," "adjacent," versus "directly adjacent," etc.).

The terminology used herein is for the purpose of describing particular embodiments only and is not intended to be limiting of example embodiments. As used herein, the singular forms "a," "an," and "the," are intended to include the plural forms as well, unless the context clearly indicates otherwise. It will be further understood that the terms "comprises," "comprising," "includes," and/or "including," when used herein, specify the presence of stated features, integers, steps, operations, elements, and/or components, but do not preclude the presence or addition of one or more other features, integers, steps, operations, elements, components, and/or groups thereof.

It should also be noted that in some alternative implementations, the functions/acts noted may occur out of the order noted in the figures. For example, two figures shown in succession may in fact be executed substantially concurrently or may sometimes be executed in the reverse order, depending upon the functionality/acts involved.

According to example embodiments, reading and writing/patterning of a substrate or workpiece is to be understood in a broad sense. For example, reading may include microscopy, inspection, metrology, spectroscopy, interferometry, scatterometry, a combination of one or more of the aforementioned, etc. Writing/patterning may include exposing a photoresist, annealing by optical heating, ablating, creating any other change to the surface by an optical beam, etc.

Example of substrates include: flat panel displays, printed circuit boards (PCBs), substrates or workpieces in packaging applications, photovoltaic panels, etc.

Example embodiments provide methods and measurement devices for measuring a position of a laser beam, where the laser beam is reflected along an arm of a rotator towards a scale at a given or desired peripheral position. As will be described in more detail below, the scale (or grating) is a pattern of transparent and reflective areas, which transmit or reflect the laser beam.

According to certain example embodiments, at least one detector system is configured to detect a reflex or transmission of laser light stemming from a laser source emitting laser light that is impinging on a surface along a radius of a rotating arm comprising an optical system while the laser light is scanning over a scale or grating positioned at a peripheral position along the radius of the rotating arm. The detector system may comprise any kind of detector or camera and may also comprise trigger means configured to generate a sequence of pulses based on the detected reflexes or transmissions of light.

The detector system may be used for determining the impinging position on a workpiece of a laser beam (e.g., a writing or reading beam) emitting light impinging on a workpiece where the impinging position of the laser beam is above or below a peripheral position along the radius of the rotating optical arm. The detector system may then be configured to detect a reflex or transmission of laser light from a scale or grating also positioned above or below a peripheral position along the radius of the rotating optical arm.

In certain example embodiments, the detector system may comprise control means for correcting a deviation from a desired writing or reading beam position, for example, by adjusting the impinging position on a workpiece of the writing or reading beam. In a writer system, the writing beam may be used for ablating a surface or for creating a pattern on a workpiece such as a substrate or a wafer.

According to certain example embodiments, correction of the writing beam, or reading beam, position may be achieved by steering the writing beam during the rotational movement of the rotating optical system, for example, by adjusting the impinging position of at least one writing beam on a workpiece during the movement of at least one rotating optical arm comprising at least one writing beam at a peripheral position.

According to at least one other example embodiment, correction of the writing beam position may be achieved by using an optical component such as a mirror (e.g., a deformable mirror) for steering the writing beam during the rotational movement of the rotating optical system.

According to yet another example embodiment, the position of a writing beam, or a reading beam, may be corrected between the scanning sweeps of a plurality of rotating optical arms, each rotating optical arm comprising at least one writing and/or reading beam.

Example embodiments are related to pattern generators, measurement systems, measurement devices and measurement tools including a rotator. The rotator may include one or more arms (e.g., 2, 3, 4, 5, 6 or even more arms), and each arm may include an optical system configured to write/pattern or read a pattern or image. In one example, the reading/writing head of an arm is stationary or essentially stationary and the optical image is translated by a rotating or swinging optical system from a position near the axis of rotation to a position further away from the axis of rotation. In one example, the rotating system may include two parallel mirrors, and may therefore scan a circle on the workpiece.

Measurement data (e.g., peripheral position data) determined according to example embodiments may be combined with other position measurement devices (e.g., linear encoders or interferometers) for the Y position and with rotational encoders for the X position. The combination may provide more absolute Cartesian coordinates during full revolutions and over full linear motion of a system.

Example embodiments may be utilized in conjunction with a continuously rotating system, which exchanges relatively little or no energy and relatively small vibrations with the environment.

At least one example embodiment provides a measurement device for measuring a peripheral position in a Cartesian coordinate system. According to at least this example embodiment, the measurement device includes: a rotating laser source, a reflector, a scale and a detector. The rotating laser source is configured to emit a rotating laser beam along a radius of a rotator. The reflector is configured to reflect the laser beam in a direction orthogonal to a path of the laser beam. The scale has a pattern of transparent and reflective areas, and is positioned at a peripheral position of the measurement device. The detector is configured to provide a sequence of pulses by detecting a reflex or transmission of the rotating laser beam while the laser beam scans over the scale. The sequence of pulses corresponds to Cartesian coordinates of the system.

At least one other example embodiment provides a method for measuring a peripheral position in a Cartesian coordinate system. According to at least this example embodiment, a rotating laser beam is emitted along a radius of a rotator; the rotating laser beam is reflected in a direction orthogonal to a path of the laser beam; and a sequence of pulses is provided by detecting a reflex or transmission of the rotating laser beam while the laser beam scans over a pattern of transparent and reflective areas positioned at a peripheral area of the measurement device. The sequence of pulses corresponds to Cartesian coordinates of the system.

According to at least some example embodiments, the rotator includes a plurality of arms, and the reflector is configured to reflect the laser beam along one of the plurality of arms of the rotator. Every other pulse in the sequence of pulses represents a position in a first direction of the Cartesian coordinate system. A time difference between consecutive pulses represents a position in a second direction of the Cartesian coordinate system.

According to at least some example embodiments, the detector may be arranged on an upper portion of the scale.

According to at least some example embodiments, the measurement device may further include a bearing (e.g., an air bearing pad) configured to maintain a fixed relative distance between the scale and the table. According to at least some example embodiments, at least one air bearing is configured to maintain a fixed relative distance (or position) between the scale and the table orthogonal to the direction of movement of the table by providing the at least one air bearing between the table and a support member of the scale.

According to at least some example embodiments, the measurement device may further include a spring loaded pad and a bearing configured to guide the scale along a side of the table.

According to at least some other example embodiments, the measurement device may include at least one pad (e.g., an air bearing pad) for maintaining a relative position between the scale and the table by extending the guiding along the side of the table in the moving direction of the table (Y direction) so that the scale follows the table rotation.

According to at least some other example embodiments, the measurement device may include at least two spring loaded pads configured to maintain the scale at a fixed position over the table by sliding along the side of the table at a given or defined distance.

According to at least some other example embodiments, the measurement device may include at least one spring loaded pad (e.g., air bearing pad) for maintaining a distance between the support member of the scale and the table in a direction orthogonal to the moving direction of the table and at least one second pad (e.g., air bearing pad) extending the guiding along the side of the table in the moving direction of the table (Y direction) so that the scale follows the table rotation.

The laser source may be separate from a source configured to emit an exposure beam. In this case, the reflector may be configured to reflect the laser beam in a first direction toward the scale and to reflect the exposure beam in a second direction toward the workpiece. Alternatively, the reflector may be configured to reflect the laser beam and the exposure beam in the same direction. In this case, the laser beam emitted by the laser source may also serve as an exposure beam for exposing a workpiece. The reflector may reflect a first portion of the laser beam toward the workpiece for exposing the workpiece and a second portion of the laser beam toward the scale. Alternatively, the first portion of the laser beam and the second portion of the laser beam may be reflected in opposite directions.

According to at least some example embodiments, the laser beam may be reflected toward the workpiece for exposing the workpiece, and a reflected portion of the laser beam for exposing the workpiece may be reflected back toward the scale, which is arranged above the reflector.

Figure 1:
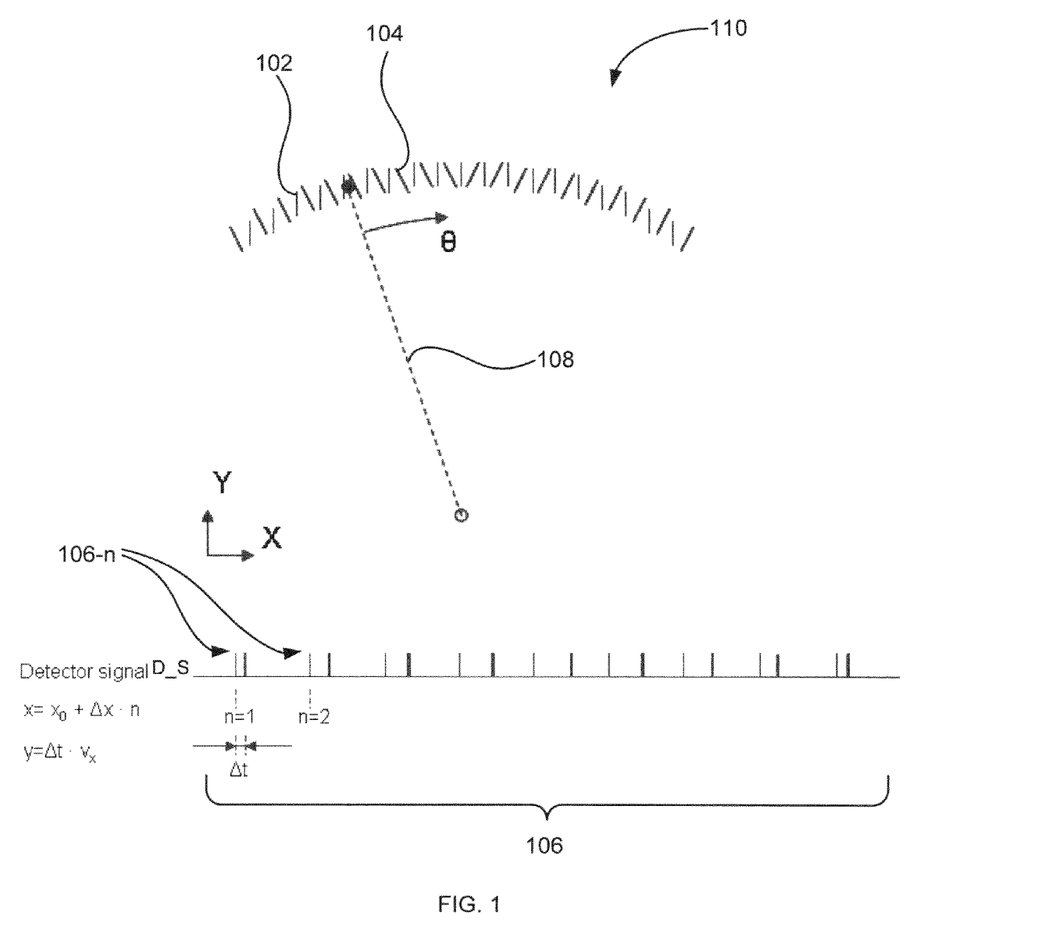
FIG. 1 illustrates a simplified, example embodiment of a measurement device or tool in which a laser beam is reflected along an arm of a rotator.

FIG. 1 illustrates a simplified, example embodiment of a measurement device or tool in which a laser beam is reflected along an arm (or radius) of a rotator.

Referring to FIG. 1, a laser beam 108 scans over a scale or grating 110 in the clockwise (or θ) direction. A reflex and/or transmission of the laser beam 108 is detected by a detector (not shown). The detector generates a detector signal D_S composed of a sequence of pulses 106 based on the detected reflexes and/or transmissions of the laser beam 108. The detector may generate a pulse for each detected reflex and/or transmission of the laser beam 108, and the sequence of pulses corresponds to Cartesian coordinate(s).

According to at least this example embodiment, the detector may be any detector configured to generate a sequence of pulses based on detected reflexes or transmissions of light. In one example, the detector discussed above with regard to FIG. 1 may be any standard or conventional light detector that measures the intensity of light.

Still referring to FIG. 1, the scale 110 includes vertical slits 102 and slanted slits 104. In this example, every other pulse 106-n of the detector signal D_S corresponds to a specific X position in the Cartesian coordinate system, and the time $\Delta t$ between two consecutive pulses corresponds to a specific Y position in the Cartesian coordinate system.

Figure 2:
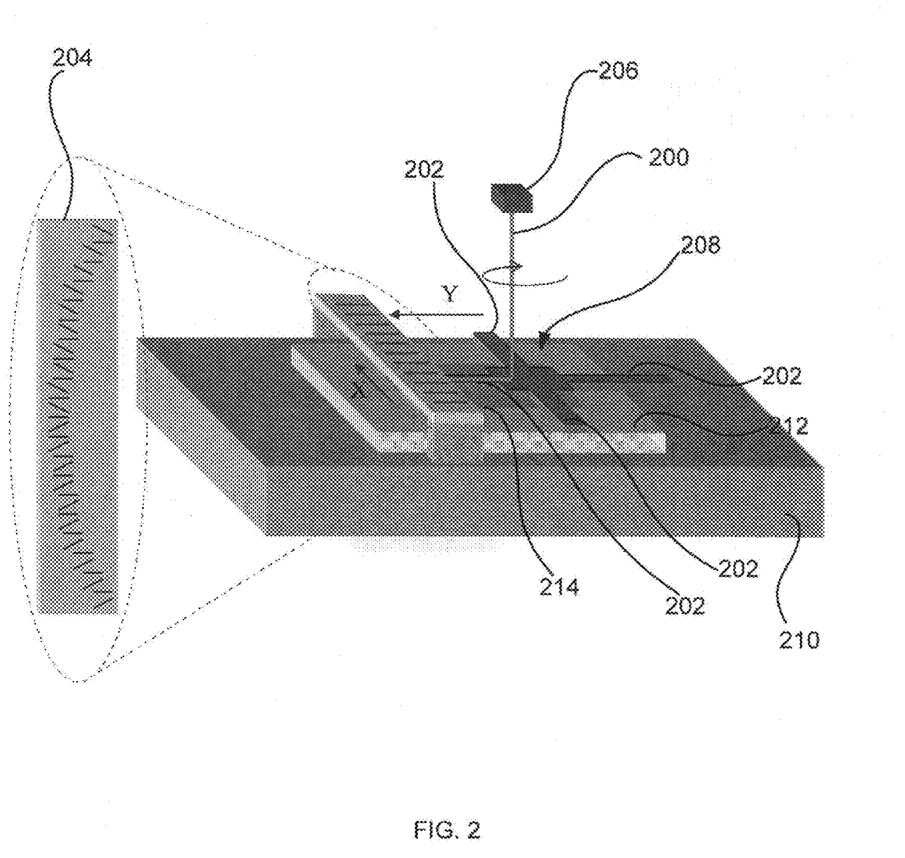
FIG. 2 shows a measurement device including a rotator according to an example embodiment.

FIG. 2 shows a measurement device or system including a rotator according to an example embodiment.

Referring to FIG. 2, the measurement device includes a rotator 208 having four arms 202. The rotator 208 is arranged above a base 210. A table 212 is arranged on the base 210 and capable of holding a workpiece 214.

In example operation, a laser source 206 emits a rotating or scanning laser beam 200 toward the rotator 208. The laser beam 200 is reflected (e.g., by a reflector, which is not shown) along an arm 202 of the rotator 208 toward a scale 204 arranged at the periphery of the table 212.

Still referring to FIG. 2, another reflector (also not shown in FIG. 2) reflects the laser beam 200 upward towards the scale 204. As the laser beam 200 scans across the scale 204, the scale 204 reflects the laser beam 200 back toward a detector located at a non-rotating position. In at least this example embodiment, the detector may be located near the laser source in a non-rotating location, and the returning light may be reflected horizontally (e.g., 90 degrees from the vertical beam in FIG. 2) by a 45 degree semi-transparent plate (not shown).

As the laser beam 200 scans the scale 204 in FIG. 2, the detector generates a detector signal including a sequence of pulses. As discussed above with regard to FIG. 1, for example, every other pulse of the detector signal corresponds to a specific X position in the Cartesian coordinate system, and the time $\Delta t$ between two consecutive pulses corresponds to a specific Y position in the Cartesian coordinate system. Thus, Cartesian coordinates of a given or desired peripheral position may be determined based on the generated detector signal.

As was the case with FIG. 1, the detector discussed above with regard to FIG. 2 may be any standard or conventional light detector that measures the intensity of light.

According to at least some example embodiments, the scale 204 and/or the table 212 may be configured to move in the X and/or Y directions such that the scale 204 is positionable relative to the table 212.

Figure 3:
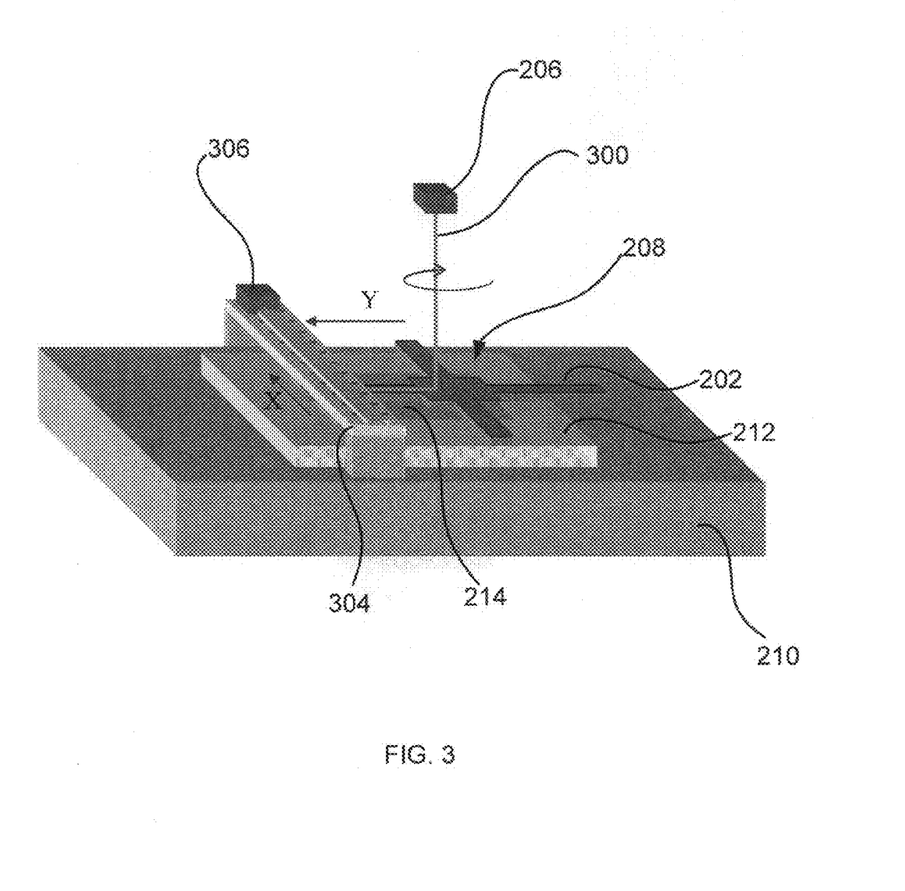
FIG. 3 shows a measurement device according to another example embodiment.

FIG. 3 shows a measurement device according to another example embodiment. The measurement device shown in FIG. 3 is similar to the measurement device shown in FIG. 2, except that the transmission of light is measured on the backside of the scale. In FIGS. 2 and 3, like numerals refer to like elements.

Referring to FIG. 3, the measurement device includes the rotator 208 having four arms 202. The rotator 208 is arranged above the base 210. The laser source 206 emits a rotating laser beam 300 toward the rotator 208. The rotating laser beam 300 is reflected along one of the arms 202 by a reflector (not shown). The laser beam 300 is then reflected up towards the scale 304 at the periphery of the table 212 by another reflector (also not shown). As the laser beam 300 scans across the scale 304, the laser beam 300 is transmitted through the scale 304 and detected by a detector 306 arranged on or relatively close to an upper surface (e.g., backside) of the scale 304.

In this example embodiment, the detector 306 generates a detector signal including a sequence of pulses. As discussed above with regard to FIGS. 1 and 2, for example, every other pulse of the detector signal corresponds to a specific X position in the Cartesian coordinate system, and the time Δt between two consecutive pulses corresponds to a specific Y position in the Cartesian coordinate system. Thus, Cartesian coordinates of a given or desired peripheral position may be determined based on the generated detector signal.

As was the case with FIGS. 1 and 2, the detector 306 discussed above with regard to FIG. 3 may be any standard or conventional light detector that measures the intensity of light.

In a system with a combination of rotational and prismatic movement (where the prismatic movement is, e.g., a moving table), the relative position in the direction orthogonal to the movement may be measured by guiding the scale 204, 304 along the side of the table 212 with a bearing. To handle rotation of the table 212, two or more guiding pads may be added such that the scale 204, 304 follows the rotation of the table 212.

According to example embodiments, the spring loaded guiding pads may be implemented in a number of ways. For example, the spring loaded guiding pads may be air bearings, sleeve bearings, magnetic bearings, etc. The pads are capable of sliding along the side of the table at a given or defined distance in the orthogonal direction, and thereby maintain the scale at a fixed position over the table.

Figure 4:
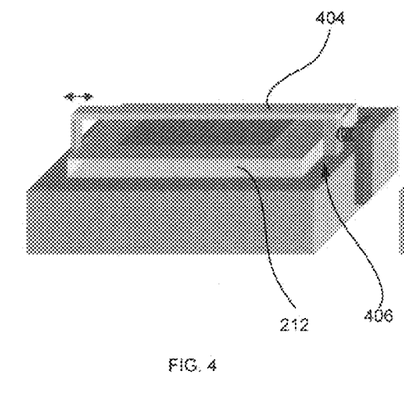
FIG. 4 illustrates a scale arrangement according to an example embodiment.

FIG. 4 illustrates a portion of a measurement device according to an example embodiment. In this example embodiment, the scale 404 is attached to a spring loaded pad 406 guided with a bearing along the side of the table 212.

Figure 5:
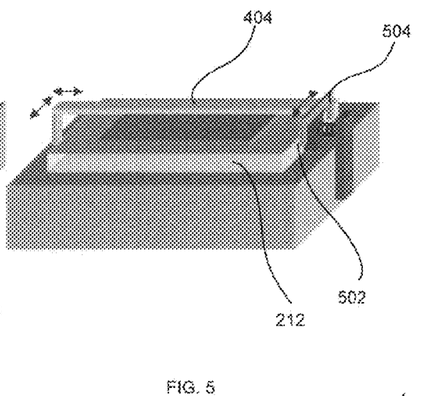
FIG. 5 shows a scale arrangement according to another example embodiment.

FIG. 5 shows a portion of a measurement device configured similar to the portion of the system shown in FIG. 4, but with two more pads 502 and 504 added to adjust the scale rotation according to the table rotation. In FIG. 5, the two extra pads 502 and 504 extend the guiding along the side of the table 212 in the Y direction so that the scale 404 follows the table rotation.

FIGS. 6 through 9 illustrate portions of measurement devices configured to reflect a measuring beam toward/on a scale according to different example embodiments. As shown and described in more detail below, the measuring beam may be derived from an exposure beam or from a completely separate laser source.

Figure 6:
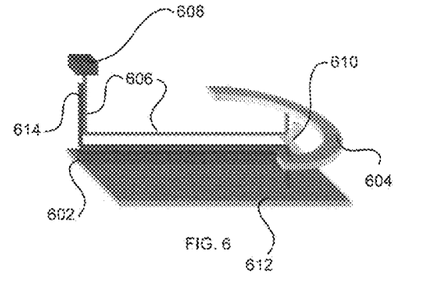
FIG. 6 shows a portion of a measurement device including an overhead scale according to an example embodiment.

FIG. 6 shows a portion of a measurement device including an overhead scale according to an example embodiment. In this example embodiment, the measuring laser beam 606 is derived from a laser source 608, which is separate from the source of an exposure beam 614.

Referring to FIG. 6, in example operation, a laser source 608 emits a rotating laser beam 606 toward an arm 602 of a rotator. The laser beam 606 is directed along the arm 602 toward a reflector 610. The reflector 610 reflects the laser beam 606 toward the scale 604, which is arranged above the table 612. The laser beam 606 scans across the scale 604, and transmissions or reflexes of the laser beam 606 are detected by a detector (not shown).

In this example, the detector may generate a detector signal based on the detected transmissions or reflexes of the scanning laser beam 606, and the Cartesian coordinates of a given or desired peripheral position may be determined based on the sequence of pulses comprising the detector signal. The detector discussed above with regard to FIG. 6 may be any standard or conventional light detector that measures the intensity of light.

According to at least the example embodiment shown in FIG. 6, the reflector 610 is arranged between the table 612 and the scale 604.

Figure 7:
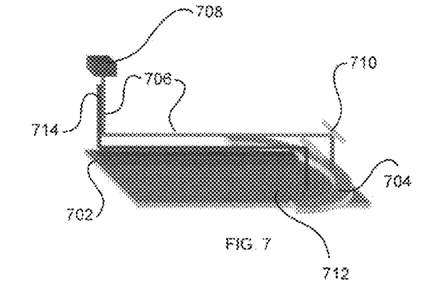
FIG. 7 shows a portion of a measurement device according to another example embodiment.

FIG. 7 shows a portion of a measurement device including a scale according to an example embodiment. In this example, the scale is arranged closer to the surface of a stage as compared to the example embodiment shown in FIG. 6. The measuring laser beam 706 in FIG. 7 is derived from a laser source 708, which is separate from the source of an exposure beam 714.

Referring to FIG. 7, the laser source 708 emits the rotating laser beam 706 toward an arm 702 of a rotator. A reflector (not shown) directs the laser beam 706 along the arm 702 toward another reflector 710. The reflector 710 reflects the laser beam 706 downward toward the scale 704, which is arranged above the table 712. As the laser beam 706 scans across the scale 704, transmissions or reflexes of the laser beam 706 are detected by a detector (not shown) as described above.

As discussed above with regard to FIG. 6, the detector may generate a detector signal based on the detected transmissions or reflexes of the scanning laser beam 706, and the Cartesian coordinates of a given or desired peripheral position may be determined based on the sequence of pulses comprising the detector signal. The detector discussed above with regard to FIG. 7 may be any standard or conventional light detector that measures the intensity of light.

In this example embodiment, the scale 704 is arranged between the reflector 710 and the table 712.

According to at least some example embodiments, light used to expose a workpiece may be used to scan the scale.

Figure 8:
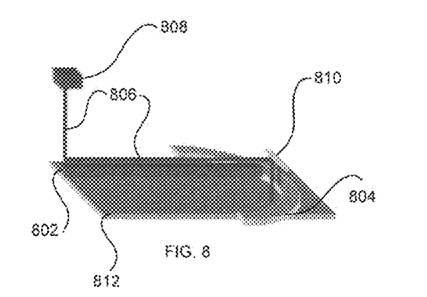
FIG. 8 shows a portion of a measurement device according to yet another example embodiment.

FIG. 8 shows an example embodiment in which a portion of an exposure beam for exposing a workpiece is used to scan a scale and determine Cartesian coordinates of a peripheral position. In this example embodiment, the measuring laser beam 806 is derived from the exposure beam.

Referring to FIG. 8, in example operation, a laser 808 emits the rotating laser beam 806 toward an arm 802 of a rotator. A reflector (not shown) reflects the laser beam 806 along the arm 802 toward another reflector 810. The reflector 810 reflects a portion of the laser beam 806 toward the table 812 and another portion of the laser beam 806 downward toward the scale 804, which is arranged above the table 812. As the laser beam 806 scans across the scale 804, reflexes of the laser beam 806 from an upper surface of the scale 804 are detected by a detector (not shown) as described above.

As discussed above, the detector may generate a detector signal based on the detected transmissions or reflexes of the scanning laser beam 806, and the Cartesian coordinates of a given or desired peripheral position may be determined based on the sequence of pulses comprising the detector signal. The detector discussed above with regard to FIG. 8 may be any standard or conventional light detector that measures the intensity of light.

Figure 9:
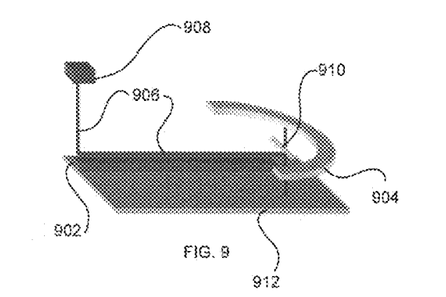
FIG. 9 shows an example embodiment in which reflection from the bottom surface of a scale is used.

FIG. 9 shows an example in which reflection/transmission from the bottom surface of a scale is used to determine Cartesian coordinates of a peripheral position. In this example embodiment, the measuring laser beam 906 is derived from an exposure beam.

Referring to FIG. 9, a laser 908 emits the rotating laser beam 906 toward an arm 902 of a rotator. A reflector (not shown) directs the laser beam 906 along the arm 902 of the rotator toward a reflector/deflector/optical element 910. The reflector/deflector 910 directs the laser beam 906 upward toward the scale 904. As the laser beam 906 scans across the scale 904, the laser beam 906 is reflected back toward the optical element 910 by the scale 904. The reflected laser beam 906 passes back through the optical element 910 and impinges the table 912 and/or is detected by a detector (not shown).

As discussed above, the detector may generate a detector signal based on the detected transmissions or reflexes of the scanning laser beam 906 and the Cartesian coordinates of a given or desired peripheral position may be determined based on the sequence of pulses comprising the detector signal. The detector discussed above with regard to FIG. 9 may be any standard or conventional light detector that measures the intensity of light.

The foregoing description has been provided for purposes of illustration and description. It is not intended to be exhaustive. Individual elements or features of a particular example embodiment are generally not limited to that particular example, but are interchangeable where applicable and can be used in a selected embodiment, even if not specifically shown or described. The same may also be varied in many ways. Such variations are not to be regarded as a departure from example embodiments, and all such modifications are intended to be included within the scope of the example embodiments described herein.

What is claimed is:

1. A measurement device for measuring a peripheral position in a Cartesian coordinate system, the measurement device comprising:
   a rotating laser source configured to emit a rotating laser beam along a radius of a rotator;
   a reflector configured to reflect the laser beam in a direction orthogonal to a path of the laser beam;
   a scale having a pattern of transparent and reflective areas, the scale being positioned at a peripheral position of the measurement device;
   a detector configured to provide a sequence of pulses by detecting a reflex or transmission of the rotating laser beam while the laser beam scans over the scale, the sequence of pulses corresponding to Cartesian coordinates of the system; and
   at least one pad and at least one bearing configured to maintain a fixed relative distance between the scale and a table; wherein
   the table is capable of holding a workpiece.

2. The device of claim 1, wherein the rotator includes a plurality of arms and the reflector is configured to reflect the laser beam toward the scale.

3. The device of claim 1, wherein every other pulse in the sequence of pulses represents a position in a first direction of the Cartesian coordinate system, and a time difference between consecutive pulses represents a position in a second direction of the Cartesian coordinate system.

4. The device of claim 1, wherein the detector is arranged on an upper portion of the scale and the detector detects transmissions of the rotating laser beam through the scale.

5. The device of claim 1, wherein the reflector is arranged between the table and the scale.

6. The device of claim 1, wherein the scale is arranged between the table and the reflector.

7. The device of claim 1, wherein the at least one pad is a spring loaded pad, and the spring loaded pad and the bearing are configured to guide the scale by sliding along a side of the table.

8. The device of claim 1, further comprising:
   at least two spring loaded pads configured to maintain the scale at the fixed position over the table by sliding along the side of the table at a given or defined distance.

9. The device of claim 1, wherein the laser source is separate from a source configured to emit an exposure beam.

10. The device of claim 9, wherein the reflector reflects the laser beam in a first direction toward the scale and reflects the exposure beam in a second direction toward the workpiece.

11. The device of claim 9, wherein the reflector reflects the laser beam and the exposure beam in the same direction.

12. The device of claim 1, wherein the laser beam emitted by the laser source is also an exposure beam for exposing a workpiece.

13. The device of claim 12, wherein the reflector reflects a first portion of the laser beam toward the workpiece for exposing the workpiece and a second portion of the laser beam toward the scale.

14. The device of claim 13, wherein the first portion of the laser beam and the second portion of the laser beam are reflected in opposite directions.

15. The device of claim 12, wherein the laser beam is reflected toward the workpiece for exposing the workpiece, and a reflected portion of the laser beam exposing the workpiece is reflected back toward the scale, which is arranged above the reflector.

16. A method for measuring a peripheral position in a Cartesian coordinate system, the method comprising:
   emitting a rotating laser beam along a radius of a rotator;
   reflecting the rotating laser beam in a direction orthogonal to a path of the laser beam; and
   providing a sequence of pulses by detecting a reflex or transmission of the rotating laser beam while the laser beam scans over a pattern of transparent and reflective areas positioned at a peripheral area of the measurement device, the sequence of pulses corresponding to Cartesian coordinates of the system; wherein
   every other pulse in the sequence of pulses represents a position in a first direction of the Cartesian coordinate system, and
   a time difference between consecutive pulses represents a position in a second direction of the Cartesian coordinate system.

17. The method of claim 16, further comprising:
   guiding, by a pad and a bearing, the scale by sliding along a side of a table to which the scale is fixed.

18. The method of claim 16, further comprising:
   maintaining the scale at a fixed position over a table by sliding at least two pads along the side of a table at a given or defined distance; wherein
   the scale is fixed to the table.

19. The method of claim 16, wherein the reflecting comprises:
   reflecting the laser beam in a first direction toward the scale; and
   reflecting an exposure beam in a second direction toward a workpiece.

20. The method of claim 16, wherein the reflecting comprises:
   reflecting the laser beam and an exposure beam in the same direction.

21. The method of claim 16, wherein the reflecting comprises:
   reflecting a first portion of the laser beam toward a workpiece for exposing the workpiece and a second portion of the laser beam toward the scale.

22. The method of claim 21, wherein the first portion of the laser beam and the second portion of the laser beam are reflected in opposite directions.

23. The method of claim 16, wherein the reflecting comprises:
   reflecting the laser beam toward a workpiece for exposing the workpiece, wherein
   a reflected portion of the laser beam for exposing the workpiece is reflected back toward the scale, which is arranged above the reflector.

* * * * *